United States Patent [19]

Hazelton

[11] 4,071,940
[45] Feb. 7, 1978

[54] CLUTCH-BRAKE UNIT FOR A PRESS AND METHOD AND JIG FOR INSTALLING THE SAME

[75] Inventor: Burton W. Hazelton, Kirkwood, Mo.

[73] Assignee: Hazelton Products, Inc., Valley Park, Mo.

[21] Appl. No.: 736,898

[22] Filed: Oct. 29, 1976

[51] Int. Cl.$^2$ .............................................. P23Q 3/00
[52] U.S. Cl. ........................................ 29/468; 29/701; 192/18 A
[58] Field of Search .................. 29/464, 465, 467, 468, 29/281.6, 701; 408/3, 115 R, 115 A; 192/12 C, 14, 15, 16, 18 A

[56] References Cited

U.S. PATENT DOCUMENTS

| 2,472,452 | 6/1949 | Wissman | 192/18 A |
| 2,505,600 | 4/1950 | Wissman | 192/18 A |
| 3,535,777 | 10/1970 | Felts | 29/468 |

*Primary Examiner*—Lowell A. Larson
*Attorney, Agent, or Firm*—Gravely, Lieder & Woodruff

[57] ABSTRACT

A clutch-brake unit for a mechanical drive, such as used on a press, has a hub which fits over a spindle at the end of a driven shaft, which may be a crankshaft, and locates against a flange on the driven shaft, thereby enclosing the entire spindle. The hub has a flange portion which carries an annular piston, and the chamber in which this piston is located is in communication with the hub interior. The hub has a drive disk mounted on it by machine screws that extend axially through the drive disk, the flange portion of the hub, and thread into the flange on the driven shaft so as to secure the hub to the shaft. The drive disk is spaced from the flange portion of the hub, and interposed between the two is a brake disk, a pressure plate, and a transfer disk. The brake disk is connected to an anchor attached to the press frame, and the pressure plate is spring loaded so as to urge the brake disk against the flange portion of the hub and thereby impede rotation of the hub. However, when the interior of the hub is pressurized, the piston moves forwardly causing the pressure plate to relax the force on the brake disk. This releases the brake disk from the flange so that the hub can rotate. The piston also forces the transfer disk against the drive disk so that the rotation of the flywheel is imparted to the hub.

The brake anchor is installed on the frame by first attaching it to a jig and passing the jig over the spindle to a position against the flange at the end of the spindle. This enables bolt holes to be made at the proper location in the supporting structure, such as a press frame, and facilitates the selection of shims or other spacers to locate the brake anchor in the proper axial position. As applied to a press, this proper position may be a machined boss on the frame of the press. The jig also has guide holes for locating those holes in the flange which receive the machine screws that hold the hub to the driven shaft.

19 Claims, 10 Drawing Figures

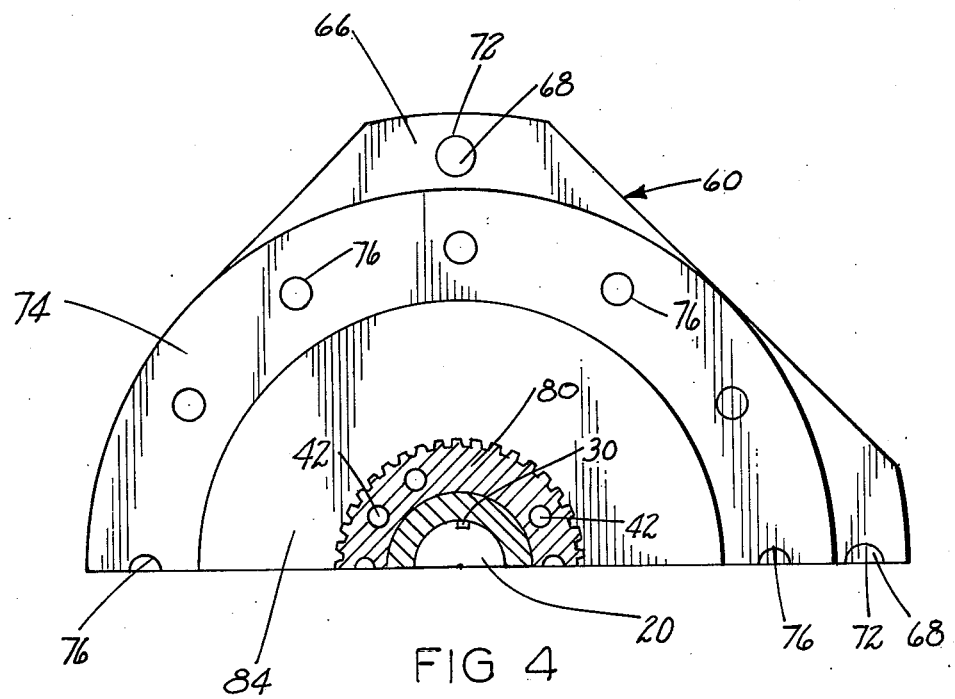
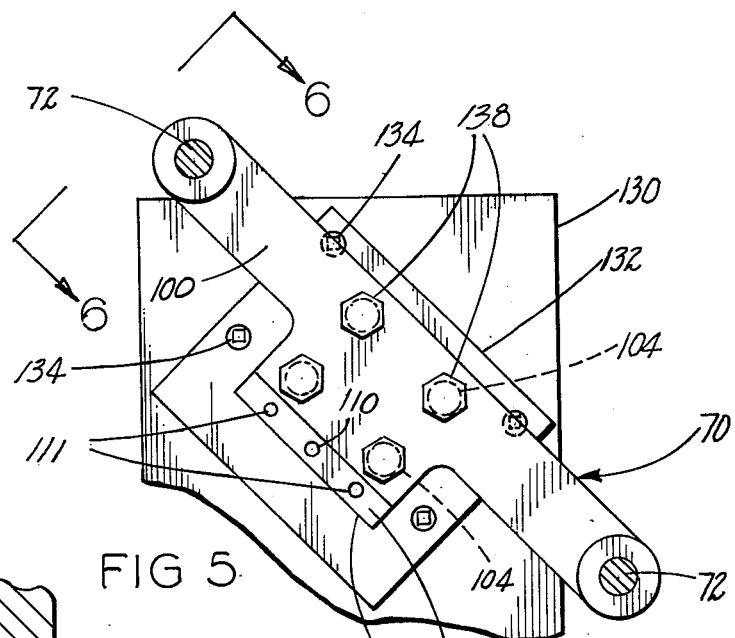
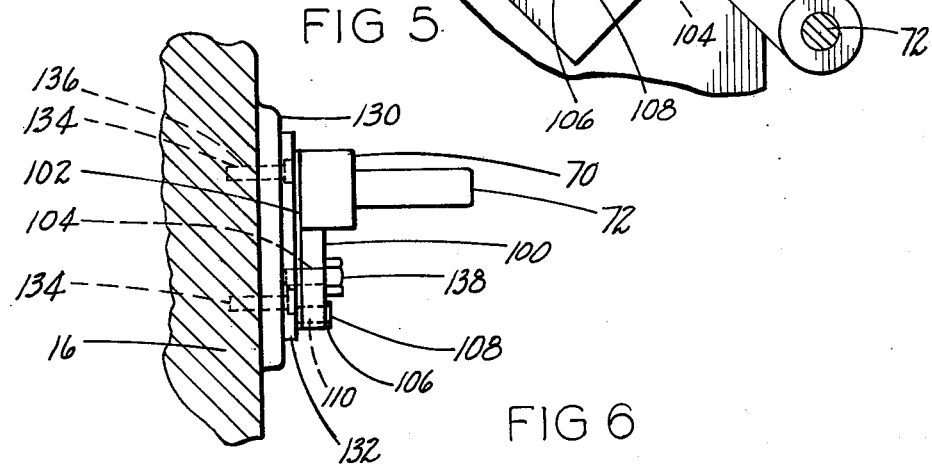

CLUTCH-BRAKE UNIT FOR A PRESS AND METHOD AND JIG FOR INSTALLING THE SAME

BACKGROUND OF THE INVENTION

This invention relates mechanical drives and more particularly to a clutch-brake unit for drives and to a method and jig for installing such clutch-brake units.

The typical press for small bending, blanking, and similar operations has a crankshaft which rotates in a frame to reciprocate a ram which actually performs the bending, blanking, or other deforming operation. The crankshaft at one end carries a large flywheel which is powered by an electric motor and normally rotates freely on the crankshaft. Some type of clutch is normally between the flywheel and the crankshaft to couple the two together when engaged, and this imparts rotation to the crankshaft. After one revolution the clutch disengages and a brake is applied to stop the crankshaft. During the single revolution, the ram moves downwardly and retracts to its initial position.

Most presses in operation today have a so-called mechanical clutch, which is merely a mechanism that projects a dog from the flywheel into the crankshaft to couple the two together. These clutches are subjected to substantial impacts each time they are engaged and as a result, fail quite frequently. This causes down time which might otherwise be put to productive use. Furthermore, these clutches provide a positive connection between the flywheel and crankshaft, and as a result, dies and various components of the press are often damaged when a jam occurs. Normally, the mechanical clutch is at one end of the crankshaft and a brake is at the other end, and sometimes difficulty is encountered coordinating the two so that the crankshaft will stop precisely at the end of one revolution.

While many existing presses utilize mechanical clutches, most presses of more recent manufacture have been provided with air-operated clutch-brake units. These units employ friction surfaces for both driving and braking. When the clutch is supplied with pressurized air, the clutch is engaged, causing the crankshaft to turn with the flywheel. On the other hand, when the air pressure is released, the clutch disengages and the brake is applied. Since friction surfaces are employed, slippage may occur, and this reduces the severity of shocks and furthermore diminishes the chance of damage due to jams. Moreover, the clutch and brake are precisely coordinated so that when one is applied, the other is released and vice versa.

Since air-operated clutch-brake units are far superior to the mechanical variety, conversion packages have been developed for converting presses having the old mechanical clutches to the air operated clutch-brakes. The conversion packages heretofore developed have been quite difficult to install on existing presses. Most of the difficulty resides in mounting the brake anchor on the frame. Also, installing a hub capable of conveying pressurized air to the clutch has been a major problem.

SUMMARY OF THE INVENTION

One of the principal objects of the present invention is to provide an air-operated clutch-brake unit for mechanical drives. Another object is to provide a clutch-brake conversion package which will provide an existing press with an air-operated clutch-brake unit. Another object is to provide a clutch-brake unit of the type stated which is easy to install, and may be installed in relatively little time. A further object is to provide a method of installing an air-operated clutch-brake unit. An additional object is to provide a jig for use in installing the brake anchor for an air-operated clutch-brake unit on a press frame and for further locating the holes necessary to secure the unit on the crankshaft. Still another object is to provide a method of installing a clutch brake unit of the type stated. These and other objects and advantages will become apparent hereinafter.

DESCRIPTION OF THE DRAWING

In the accompanying drawings which form part of the specification and wherein like numerals and letters refer to like parts wherever they occur.

FIG. 4 is a fragmentary sectional view taken along line 4—4 of FIG. 3;

FIG. 5 is a sectional view taken along line 5—5 of FIG. 3 and showing the brake anchor attached to the press frame;

FIG. 6 is an elevational view of the brake anchor taken along line 6—6 of FIG. 5;

DETAILED DESCRIPTION

Figure 1:
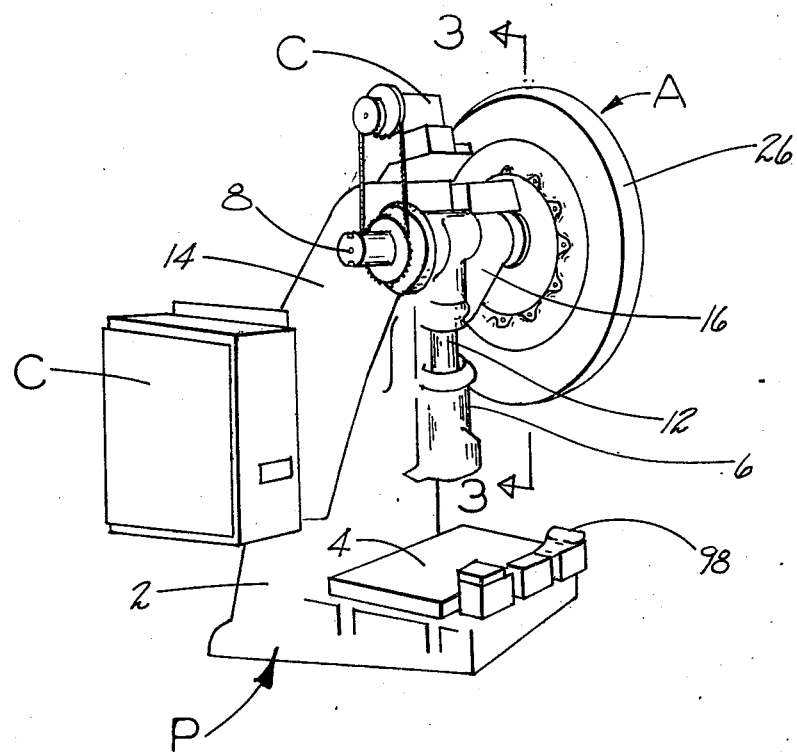
FIG. 1 is a perspective view of a press provided with the clutch-brake unit of the present invention.
Figure 2:
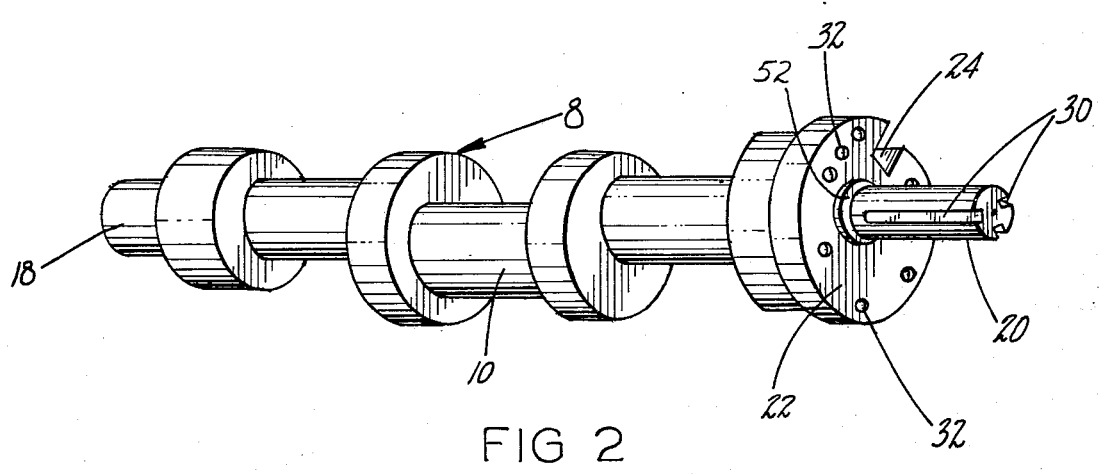
FIG. 2 is a perspective view of the crankshaft for the press with the crankshaft being modified at its end to accommodate the clutch brake unit.

Referring now to the drawing (FIG. 1) P designates a mechanical press including a frame 2 having a bed 4 over which a ram 6 reciprocates. The ram 6 is powered by a crankshaft 8 (FIG. 2) having an eccentric portion or crankpin 10 to which the ram 6 is connected through a connecting rod 12 (FIG. 1). The crankshaft 8 has a journal beyond each end of the crankpin 10 and these journals rotate in bearings on the frame 2. Indeed, the frame 2 has two heavy cast arms 14 and 16 which extend upwardly from the bed 4 on each side of the ram 6 and its connecting rod 12. The crankshaft 8 extends through the arms 14 and 16 and the bearings which receive its journals are located in those arms. The crankshaft 8 projects beyond both arms 14 and 16 (FIG. 2) in the form of spindles 18 and 20, respectively, with the latter further being provided with an integral flange 22. In presses having the old mechanical clutches, this flange 22 is normally provided with a notch 24 into which the dog of the clutch is projected when it is desired to engage the clutch.

The spindle 20 carries a flywheel 26 which normally rotates freely thereon and is powered by an electric motor mounted on the press frame 2. The flywheel 26, however, may be coupled with the crankshaft 8 to rotate the crankshaft 8 and thereby cause the ram 6 to reciprocate. This coupling is effected through a clutch-brake unit A which is mounted on the spindle 20 and has its clutch portion connected to the flywheel 26, and its brake portion anchored on the arm 16 of the frame 2. The clutch-brake unit A is air-operated, and the flywheel 26 forms a part of it.

The crankshaft 8 (FIG. 2) requires very minor modifications to accommodate the clutch-brake unit A. These modifications include turning down the spindle 20 to the proper diameter, facing that surface of the flange 22 which is presented outwardly so that the surface is precisely at a right angle to the axis of the spindle 20, milling several axial flutes 30 into the spindle 20, and drilling and tapping several axial holes 32 in the flange 22. All of the foregoing are simple machining operations.

Figure 2A:
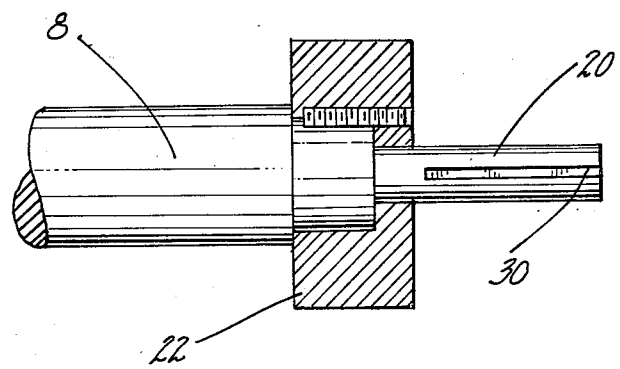
FIG. 2A is a cross-sectional view of the end for a slightly different type of crankshaft which may be on the press.

While the crankshafts 8 of most presses have the flange 22 as an integral part, some crankshafts 8 merely have a spindle 20 with no flange 22. In that case it is necessary to install a separate flange 22 (FIG. 2A). This involves turning down the spindle 20 and machining flutes 30 into it as previously described. It also involves turning down a portion of the crankshaft adjacent to the spindle, so that portion is capable of being forced into a bore in the separate flange 22. A snug interference fit exists between the two. Then axial holes are drilled into flange 22 with their centers aligned with the circumferential surface of the turned down portion, that is the surface where the interference fit exists. These holes are tapped, and socket head set screws are threaded into them. The set screws have countersunk heads. Hence, like the integral flange 22, the separate flange 22 is fixed firmly to the crankshaft 8.

Figure 3:
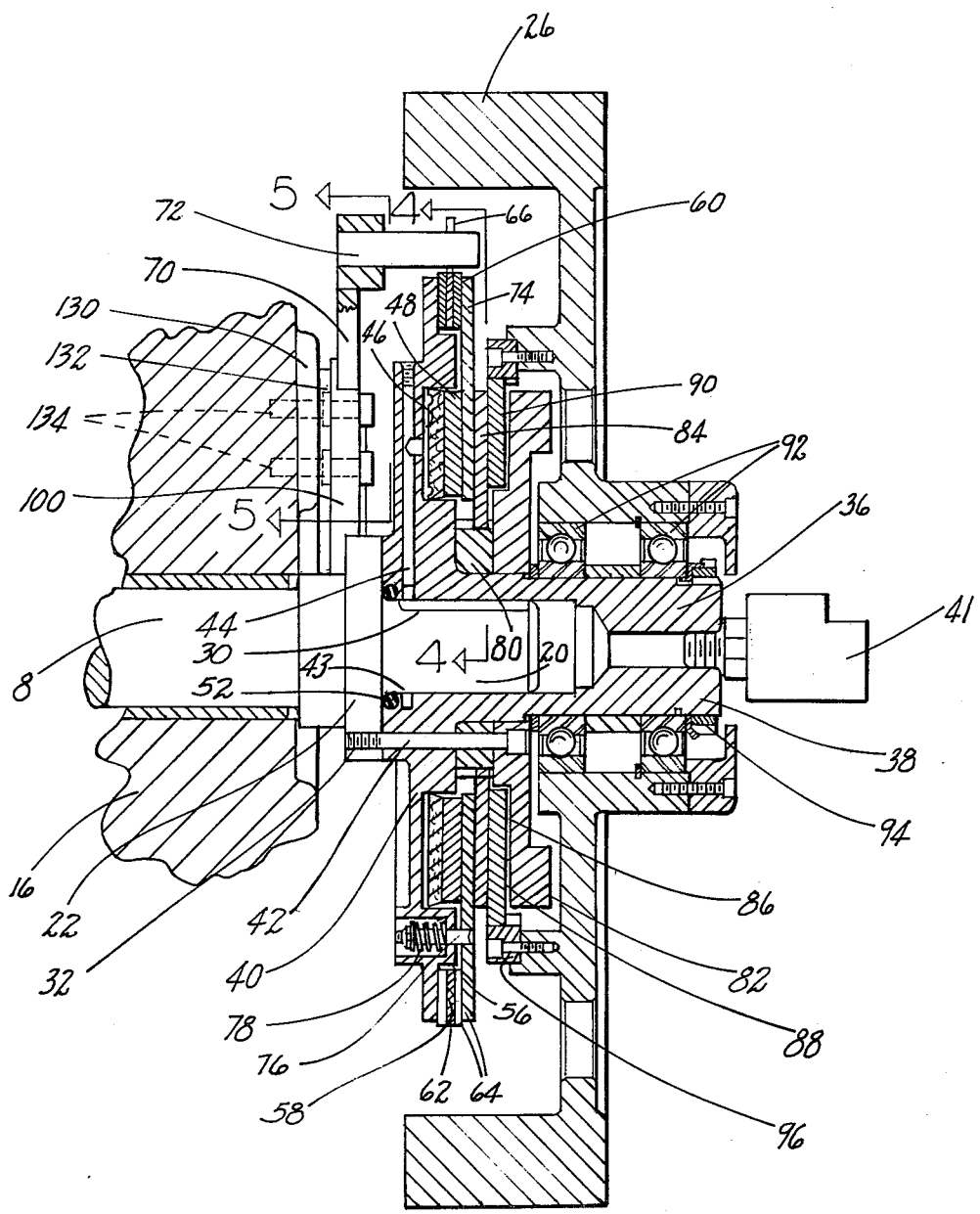
FIG. 3 is a sectional view of the clutch-brake unit taken along line 3—3 of FIG. 1.

The clutch-brake unit A (FIG. 3) includes a mounting hub 36 having an axial portion 38 and a flange portion 40 radiating from the back end of the axial portion 38. The axial portion 38 fits snugly over the spindle 20 and has an air passage which opens out of its front end where it is fitted with a rotating union 41 which is connected to a source of pressurized air. The flange portion 40 is held firmly against the flange 22 on the crankshaft 8 by machine screws 42 which extend through the flange portion 40 and thread into the holes 32 of the flange 22. At the inner ends of the axial flutes 30 on the spindles 20, the hub 36 is provided with an inwardly opening annular groove 43 and radiating from the groove 43 are a plurality of radial bores 44 which empty into an annular chamber 46. That chamber opens forwardly, that is axially away from the press frame 2, and it contains an annular piston 48 sealed by an elastomeric material. Interposed between the flange portion 40 on the hub 36 and the flange 22 on the crankshaft 8 is an elastomeric O-ring 52 which prevents air from escaping between the two flanges 22 and 40 when the interior of the hub 36 is pressurized. This pressurization occurs by admitting compressed air through the rotating union 41, and the increase in pressure is transmitted through the axial flutes 30, the annular groove 43, and the radial bores 44 to the annular chamber 46, causing the piston 48 within the chamber 46 to move axially away from the press frame 2.

The flange portion 40 along its periphery has a recess 56, the back of which is a smooth friction surface 58. Fitted into the recess 56 is an annular brake disk 60 which is of composite construction and includes a metal ring 62 and separate friction rings 64 bonded against each face of the metal ring 62. One friction ring 64 is presented toward the friction surface 58 on the hub flange portion 40, while the other friction ring 64 is presented forwardly beyond the forward face of the flange portion 40. The metal ring 62 for the most part has the same diameter as the two friction rings 64, that diameter being the same as the outside diameter of the hub flange portion 40. However, at two locations the metal ring 62 extends beyond the friction ring 62 in the form of radial projections 66 (FIGS. 3 and 4) which are provided with holes 68.

The projections 66 are located opposite a brake anchor 70 (FIGS. 3, 5 and 6) which is bolted securely to the arms 16 on the frame 2. The anchor 70 has pins 72 which project therefrom into the holes 68 of projections 66, and this prevents the brake disk 60 from rotating with the hub 36, yet permits it to move axially with respect to the hub 36.

Overlying the forward faces of both the annular piston 48 and the brake disk 60 is a pressure plate 74 (FIGS. 3 and 4) which is maintained in place on the hub flange portion 40 by axially extending pins 76. Each pin 76 at the back of the hub flange portion 40 is encircled by a coil-type compression spring 78 (FIG. 3) which urges the plate 74 rearwardly. This has two effects. First, it urges the annular piston 48 into its chamber 46 in the hub flange portion 40, and secondly it causes the brake disk 60 to be compressed between the plate 74 and the friction surface 58 of the hub flange portion 40, thus applying the brake. The annular piston 48 when pressurized counteracts the force exerted by the springs 78 and accordingly releases the brake.

The machine screws 42 which secure the hub 36 to the flange 22 on the crankshaft 8, further secure a small ring spline 80 (FIGS. 3 and 4) and a drive disk 82 (FIG. 3) to the flange portion 40 and hence the spline 80 and disk 82 rotate with the hub 36 and crankshaft 8. The spline 80 is interposed between the hub flange portion 40 and the drive disk 82 and has outwardly projecting teeth which mesh with the teeth on a floating plate 84 such that the spline 80 and floating plate 84 are locked together and will rotate in unison, while still enabling the plate 84 to shift axially with respect to the hub 36. The back face of the floating plate 84 is presented toward the front face of the pressure plate 74.

The drive disk 82 (FIG. 3) has a recess 86 which opens toward the floating plate 84 and hub flange portion 40, and at the back of the recess 86 is a friction surface 88. The recess 86 contains a transfer disk 90 having outwardly projecting teeth. The transfer disk 90 is formed from a high friction material which is capable of withstanding elevated temperatures. When the annular piston 48 is energized, the pressure plate 74 moves axially and bears against the floating plate 84, causing it to slide axially on the small spline 80, and the floating plate 84 in turn bears against the transfer disk 90, forcing it against the friction surface 88 of the drive disk 82. In effect, the transfer disk 90 is compressed between the floating plate 84 and the friction surface 88 and will rotate with them even though the coupling is of a purely frictional nature.

The flywheel 26, which forms part of the unit A, is mounted on the axial portion 38 of the hub 36 by means of bearings 92 (FIG. 3) which are held in place by a nut 94 threaded over the axial portion 38. The flywheel 26 has a large ring spline 96 attached to its back face, and this spline has inwardly projecting teeth which mesh with the outwardly projecting teeth on the transfer disk 90. Consequently, the transfer disk 90 will rotate with the flywheel 26, yet is free to move in the axial direction. As previously noted, the flywheel 26 is powered by a motor.

The rotating union 41 is connected to a source of compressed air through a controller C (FIG. 1) which is further coupled to the crankshaft 8 at spindle 18 thereon to sense the position of rotation for the crankshaft 8. The controller C further includes a manual actuator 98. When the actuator 98 is depressed, pressurized air is admitted to the rotating union 41, and this pressurized air releases the brake and engages the clutch of the clutch-brake unit A. As a result the rotating flywheel 26 is coupled with and turns the mounting hub 36 and the crankshaft 8. The pressurized air is supplied usually for one revolution and upon completion of that revolution, the air line leading to the rotating union 41 is vented. This disengages the clutch and applies the brake of the clutch-brake unit A so that crankshaft 8 stops rotating. However, the pressurized air may be supplied for only a partial revolution, as when interrupted by safety sensors, or it may be supplied on a continuous basis, in which case the crankshaft 8 will continue to turn.

More specifically, when the interior of the mounting hub 36 is vented, the compression springs 78 force the pressure plate 74 rearwardly and compress the brake disk 60 between the friction surface 58 on the hub 36 and the pressure plate 74. The brake disk 60, however is prevented from rotating by the brake anchor 70, and as a result the mounting hub 36 does not rotate, even though the flywheel 26 revolves about the axial portion of the hub 36.

However, when pressurized air is supplied to the rotating union 41, the entire interior of the mounting hub 36 is pressurized. The increase in pressure within the annular chamber 46 forces the annular piston 48 forwardly with a force sufficient to overcome the force exerted by the springs 78. As a result the frictional contact between the brake disk 60 and the friction surface 58 and between the brake disk 60 and the pressure plate 74 is relaxed and the brake disk 60 no longer impedes rotation of the mounting hub 36. Since the floating plate 84 is against the pressure plate 74, it likewise moves forwardly with the pressure plate 74 and in so doing the transfer disk 90 is compressed between floating plate 84 and the drive disk 82. Inasmuch as the transfer disk 90 rotates with the flywheel 26, a frictional coupling is developed between the flywheel 26 and the mounting hub 36. Consequently, the mountings hub 36 rotates with the flywheel 26, and the crakshaft 8, being connected to the mounting hub 36, likewise rotates.

At the end of one revolution, the controller again vents the interior of the mounting hub 36 so that the annular piston 48 no longer exerts a force on the pressure plate 74. The springs 78 move the pressure plate 74 rearwardly, and in so doing release the transfer disk 90 so that it merely floats in the recess of the drive disk 82, thereby disconnecting the mounting hub 36 from the flywheel 26. The brake disk 60 on the other hand is compressed between friction surface 58 of the hub flange 40 and the pressure plate 74, and since the brake disk 60 will not rotate, the mounting hub 36 is braked. In effect, it quickly comes to rest, as does the crankshaft 8 which is coupled to it.

In contrast to the preparation of the crankshaft 8, mounting an anchor for a clutch brake unit has heretofore been a difficult procedure, primarily due to the inability to position the heavy frame 2 of the press A on a machine tool. In this regard, the brake anchor 70 must be located such that its pins 72 are the proper distance from the spindle 18 and are oriented precisely parallel to the axis of the spindle 18.

The anchor 70, in addition to the pins 72, has a base plate 100 (FIGS. 5 and 6) from which the pins 72 project, and the base plate 100 has a planar back face 102, which is normal to the axes of the pins 72, and bolt holes 104 which extend completely through it. The inner most surface of the base plate 100 is a straight positioning edge 106, and along this edge 106 the plate 100 is provided with planar locating surface 108 which is parallel to the planar back face 102. Opening out of the planar surface 108 is a threaded bolt hole 110 and a pair of locating holes 111.

Figure 8:
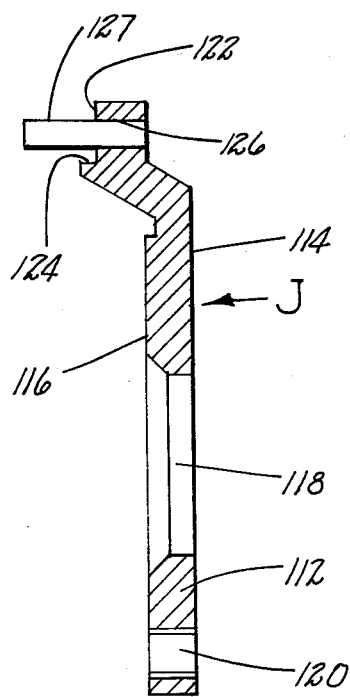
FIG. 8 is a sectional view of the jig taken along line 8—8 of FIG. 7.
Figure 7:
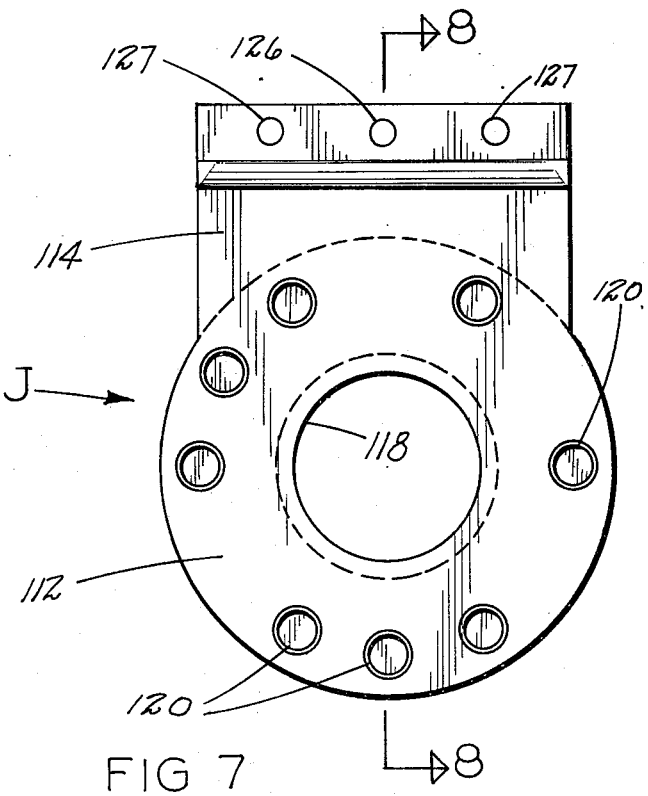
FIG. 7 is a front elevational view of jig used to install the brake anchor for the clutch-brake unit.

The brake anchor 70 is installed in precisely the proper position on the frame 2 by means of a jig J (FIGS. 7 and 8) which includes a circular portion 112 and an arm 114 formed integral with and radiating from the circular portion 112. The circular portion 112 has a planer back face 116 and a center bore 118. The diameter of the bore 118 is such that the jig J will slide over the spindle 20 to a position in which the back face 116 is against the flange 22 at the end of the spindle 20. Nevertheless, little if any clearance exists in the radial direction. The circular portion 112 further has guide holes 120 arranged concentrically around the bore 118, with the radial position of and the circumferential spacing between these holes 120 being the same as the radial positioning and circumferential spacing of the tapped holes 32 in the flange 22. Indeed, the guide holes 120 are used during the machining of the crankshaft 8 to locate the holes 32 so that those holes 32 are drilled and tapped at the proper location. The center portion 112 is slightly larger in diameter than the flange 22 on the crankshaft 8.

The arm 114, which projects from the center portion 112, is offset slightly rearwardly from the center portion 112 and has a planer back face 122 (FIG. 8) which is slightly narrower than the planar locating surface 108 on the base plate of the brake anchor 72. One edge of the back face 122 is located along a shoulder 124 which projects axially from the arm 114 and is perfectly straight. Finally the arm 114 is provided with a bolt hole 126 and a pair of locating pins 127, there being a pin 127 on each side of the hole 126. The spacing between the hole 126 and pins 127 equals the spacing between the threaded bolt hole 110 and locating holes 111 in the base plate 100 of the anchor 72. Moreover, the hole 126 and pins 127 are set back from the shoulder 124 a distance equalling the set back of the hole 110 and 111 from the straight edge 106.

Figure 9:
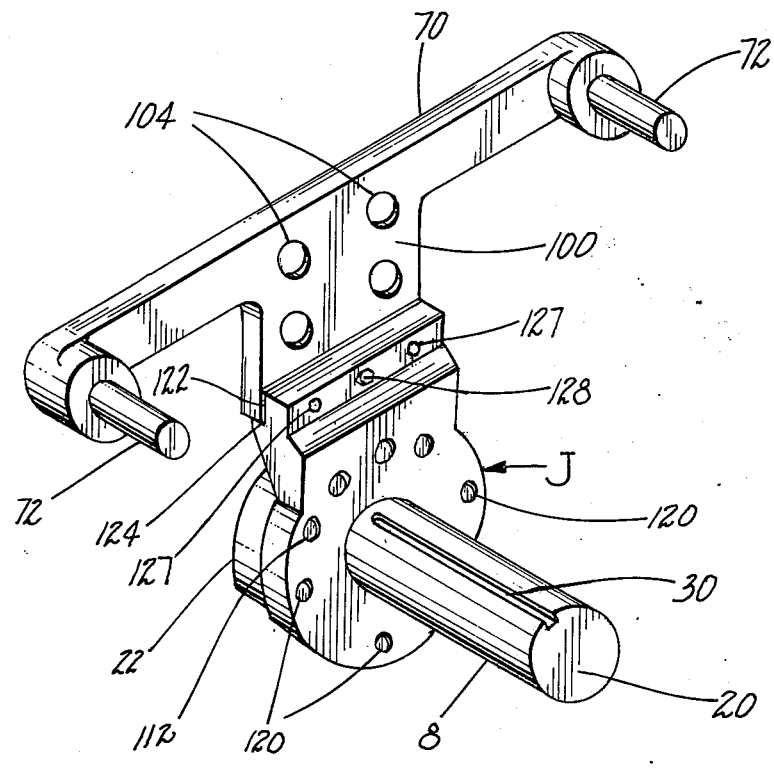
FIG. 9 is a perspective view showing the brake anchor attached to the jig and the jig fitted over the spindle on the crankshaft.

In order to properly locate and mount the brake anchor 70 on the frame 2, the brake anchor 70 is first bolted to the jig J (FIG. 9). This is achieved by placing the planar back face 122 of the jig J against the planar forward surface 108 of the base plate 100 on the brake anchor 72 with the straight edge of the base plate 100 being against the shoulder 124 of the jig 126. Moreover, the pins 127 are fitted into the locating holes 111 to properly locate the anchor 70 with respect to the jig J. This brings the holes 110 and 126 into registration and a bolt 128 is inserted through the latter and threaded into the former, thus securing the jig J and brake anchor 70 firmly together.

After the spindle 20 and the flange 22 on the crankshaft 8 have been machined to the proper dimensions and the crankshaft 8 again installed on the arms 14 and 16 of the frame 2, the jig J is passed over the spindle 20 and moved against the flange 22 at the end of the spindle 20 (FIG. 9). In this connection, the spindle 20 is received in the center bore 118 of the circular portion 112 on the jig J and the planar back face 116 of the circular portion 112 is brought against the planar front face of the flange 22. When the jig J is so disposed, the brake anchor 72 will be in the proper radial as well as the proper axial position with respect to the spindle 20. Moreover, its pins 72 will be precisely parallel to the axis of the spindle 20. Now, the jig J with the brake anchor 70 joined to it is rotated until the brake anchor 70 is located opposite a suitable flat surface on the arm 16 of the frame 2. In most instances this will be a machined boss 130 having a planar front face which is machined perpendicular to axis of the crankshaft 8. Practically every press is provided with a boss 130, which is used as a mount for the actuating mechanism of the former mechanical clutch.

In most instances the back face of the brake anchor 70 will be spaced from the planar surface of the boss 130. The thickness of this space is noted, and then a mounting plate 132 is selected having the thickness of the space. The mounting plate 132 is bolted to the boss 130 with bolts 134, the heads of which are countersunk into the plate 132. Next, the bolt holes 104 in the base plate 100 of the brake anchor 72 are used to locate the positions for bolt holes 136 (FIGS. 3 and 5) in the mounting plate 132. Those bolt holes 136 may be drilled with a hand-held drill and are thereafter tapped. The brake anchor 70 is then detached from the jig J and is secured to the mounting plate 132 by inserting bolts 138 through the bolt holes 104 in the base plate 100 and threading those bolts 138 into holes 136 in the mounting plate 132. The jig J is, of course, removed from the spindle 20.

Thereafter, the O-ring 52, the mounting hub 36, the small ring spline 80, and the drive disk 82 are installed on the spindle 18 and secured firmly in place with the machine screws 42, with the brake disk 60, pressure plate 74, floating plate 84, and transfer disk 90 interposed in that order between the hub flange portion 40 and the drive disk 82. The holes 68 in the projection 66 on the metal ring 62 for the brake disk 60 are of course aligned with the pins 72 of the brake anchor 70 so as to receive the pins 72. It is significant to note that the hub 36 is installed without the need of a press fit or keys and keyways.

Then the flywheel 26 is installed over the axial portion 38 of the mounting hub 36 and in so doing the teeth on the large ring spline 96, which is attached to it, are meshed with the teeth in the transfer disk 90. Finally, the rotating union 41 is connected to the end of the axial portion 38 for the mounting hub 36.

While the clutch-brake unit A has been described in conjunction with press, it may be used on other machinery and equipment where an interrupted drive is necessary.

This invention is intended to cover all changes and modifications of the example of the invention herein chosen for purposes of the disclosure which do not constitute departures from the spirit and scope of the invention.

What is claimed is:

1. A method for installing an air-operated clutch-brake unit on the spindle of a shaft which rotates in a press frame having a boss provided with a flat machined surface that is perpendicular to the axis of the spindle and is located near the spindle, the clutch-brake unit including a mounting hub configured to fit over the spindle and adapted to rotate with the spindle, a brake element located adjacent to the hub, a flywheel adapted to rotate relative to the hub and spindle about an axis coincident to the hub axis, means for coupling the flywheel with the hub, means for urging the brake element against the hub, and a brake anchor having a base and a pin projected from the base and capable of fitting into the brake element; said method comprising: placing a jig over the spindle of the shaft; attaching the brake anchor to the jig, the jig locating the brake anchor in the proper radial position and in the proper angular orientation with respect to the axis of the spindle such as to enable the pin of the brake anchor to project into the brake element; attaching the base of the brake anchor to the frame at the flat machined surface of the boss in said proper radial and angular position determined by the jig; removing the jig from the brake anchor and spindle; installing the mounting hub on the spindle of the shaft; installing the brake element over the hub and fitting it over the pin of the brake anchor; and mounting the flywheel so that it will rotate about the hub axis.

2. The process according to claim 1 wherein the brake anchor has bolt holes; and the step of attaching the brake anchor to the frame comprises: using the bolt holes in the brake anchor to locate the positions of corresponding bolt holes in a mounting element attached to the boss while the brake anchor is attached to the jig and the jig is on the spindle, and making the corresponding bolt holes in said mounting element.

3. The process according to claim 1 wherein the shaft further has a flange at one end of the spindle, and the step of placing the jig over the spindle further includes moving the jig against the flange on the shaft, the jig further locating the brake anchor in the proper axial position with respect to the spindle.

4. The process according to claim 3 wherein the step of attaching the brake anchor to the frame further includes installing a mounting plate between the brake anchor and the flat surface of the frame so that the brake anchor remains in the same axial position as when attached to the jig.

5. The method according to claim 3 wherein the step of installing the mounting hub on the spindel includes passing screws through the hub parallel to the axis thereof and threading the screws into the flange on the shaft.

6. The method according to claim 3 wherein the portion of the jig which locates against the flange on the shaft has guide holes therein; and further comprising using the guide holes to locate the positions of holes into which the screws thread, and making the holes into which the screws thread.

7. The method according to claim 5 and further comprising installing the flywheel over the mounting hub after the hub is installed on the spindle such that the flywheel will rotate about the hub axis.

8. The process according to claim 5 wherein the mounting hub slides easily over the spindle and further comprising forming an air-tight seal between the end of the hub and the shaft.

9. In combination with a press having a frame and a crankshaft spindle projecting from the frame, and with a clutch-brake unit that mounts on the crankshaft spindle and includes a mounting hub, a brake element located adjacent to the hub, a flywheel which rotates about an axis coincident to the hub axis, means for coupling the flywheel with the hub, means for urging the brake element against the mounting hub to impede rotation of the hub, and a brake anchor having a base that is mountable on the press frame and at least one pin that projects from the base and into the brake element so as to prevent the brake element from rotating when the brake element is urged against the hub, a jig for locating the brake anchor properly with respect to the spindle, said jig comprising: a first portion having an aperture which is sized to receive the spindle without permitting significant lateral motion; and a second portion connected rigidly to the first portion and configured to fit against the brake anchor such that the brake anchor is in a predetermined position with respect to the jig, whereby the brake anchor will be spaced a known distance from the axis of the spindle.

10. The structure according to claim 9 and further comprising means for firmly securing the base of the brake anchor to the second portion of the jig.

11. The structure according to claim 10 wherein the means for securing the base of the brake anchor to the jig comprises a bolt and dowels.

12. The structure according to claim 11 wherein the bolt passes through a bolt hole in the second portion of the jig and threads into the brake anchor.

13. The structure according to claim 10 wherein the base of the brake anchor has a planar locating surface and the second portion of the jig has a planar surface against which the locating surface of the brake anchor is positioned when the brake anchor is attached firmly to the second portion of the jig.

14. The structure according to claim 13 wherein the planar locating surface on the brake anchor is located adjacent to a straight edge on the brake anchor, and the second portion of the jig has a shoulder which is located adjacent to the planar surface thereon, the straight edge of the brake anchor being against the shoulder of the jig when the brake anchor is secured firmly to the jig.

15. The structure according to claim 9 wherein the brake anchor has pins which engage the brake element of the hub; and wherein the pins are parallel to the axis of the spindle when the brake anchor is attached to the jig.

16. The structure according to claim 9 wherein the shaft has a flange at the end of the spindle, and the first portion of the jig has a planar back face which abuts the flange when the jig is properly located on the spindle whereby the jig also locates the brake anchor in a predetermined axial position with respect to the flange on the shaft.

17. The structure according to claim 16 wherein the first portion of the jig has guide holes around the bore therein, the guide holes being located opposite the flange of the spindle when the jig is against the flange so as to enable holes to be made in the flange for receiving machine screws which secure the mounting hub in place.

18. A clutch-brake unit for a press including a frame having a boss provided with a flat surface, a crankshaft provided with a spindle at its end and a flange from which the spindle projects, the axis of the spindle being perpendicular to the plane of the flat surface on the boss, a ram connected to the crankshaft such that it reciprocates when the crankshaft rotates, and a motor, said clutch-brake unit comprising a mounting hub including an axial portion and a flange portion extended radially from the axial portion, the hub being mounted with the spindle received in the axial portion and the flange portion against the flange or the crankshaft such that the hub completely encloses the spindle, the flange portion having an annular chamber which is in communication with the interior of the axial portion; a seal between the hub and the spindle adjacent to the flange on the crankshaft; a rotating union connected to the axial portion, the rotating union being connected with a source of compressed air; an annular piston in the annular chamber of the flange portion on the mounting hub; a brake disk against the flange portion of the hub; a brake anchor including a base plate secured to the flat surface of the boss and at least one pin projected from the base plate parallel to the spindle axis, the pin being projected through the brake disk such that the brake disk can move toward and away from the flange portion of the hub; a pressure plate located opposite the brake disk and the piston; springs urging the pressure plate against the annular piston and brake disk so as to force the piston into the annular chamber and the brake disk against the flange portion whereby to impede the hub from rotating; a drive disk around the axial portion of the hub; machine screws extended through the drive disk and axial portion of the hub and being threaded into the flange on the crankshaft so that the hub and drive disk will rotate with the crankshaft; a transfer disk located between the pressure plate and the drive disk such that when the piston moves forwardly as a result of pressurized air being admitted to the annular chamber, the transfer disk will move against the drive disk; a flywheel mounted for rotation on the axial portion of the hub and being connected to and rotated by the motor; the flywheel further being connected to the transfer disk such that the rotation of the flywheel is imparted to the transfer disk, whereby when the piston is moved by pressurized air and the transfer disk is forced against the drive disk, the brake disk is released from the hub and the transfer disk is forced against the drive disk so that the rotation of the flywheel is likewise imparted to the hub and the crankshaft.

19. A clutch-brake unit according to claim 18 and further comprising a mounting plate through which the brake anchor is secured to the boss, the mounting plate overlying and being attached to the boss and the base plate being attached to the mounting plate.

* * * * *